(No Model.) 4 Sheets—Sheet 1.
A. R. ROE.
RECIPROCATING ELECTRIC MOTOR.
No. 510,367. Patented Dec. 5, 1893.
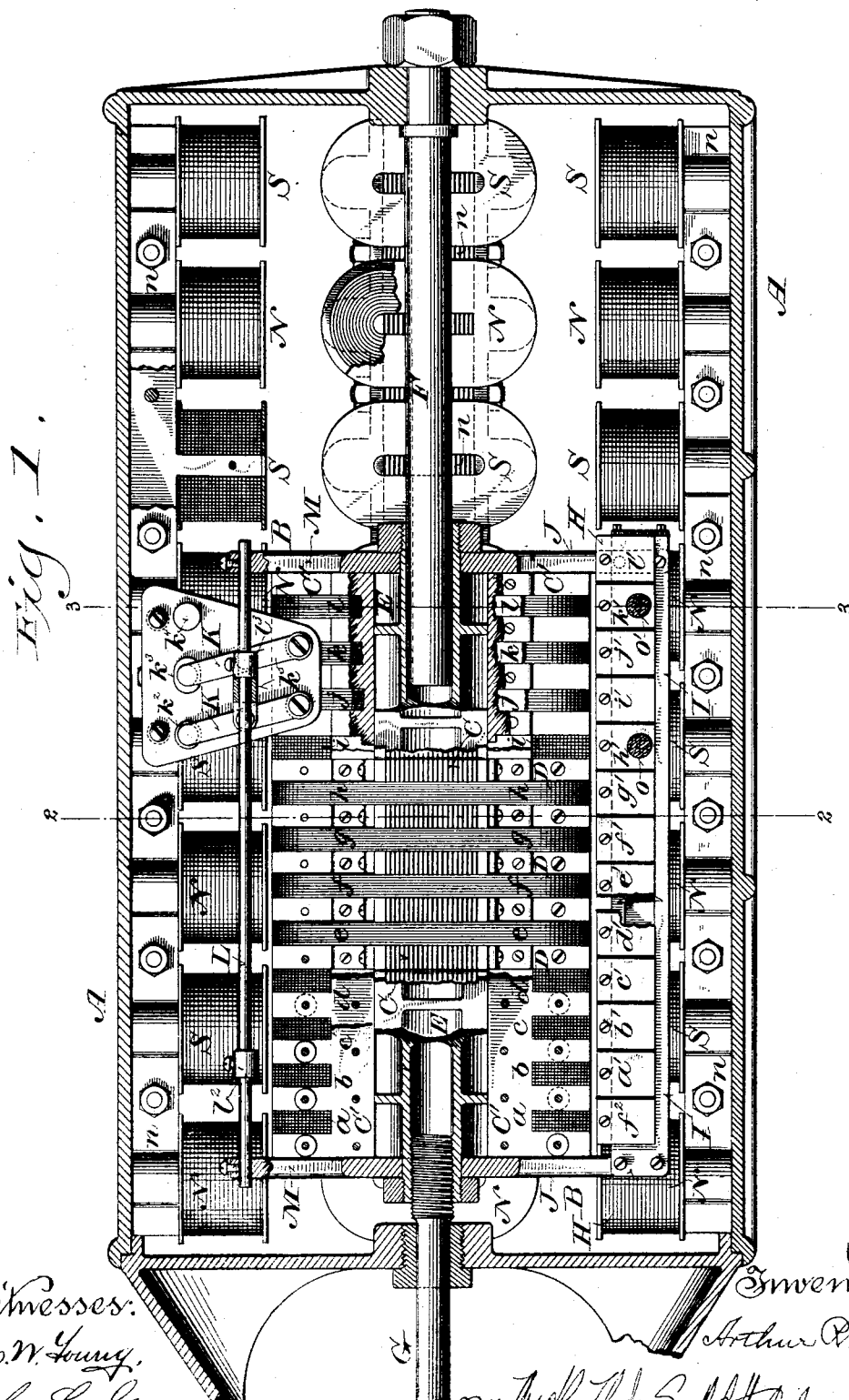

(No Model.) 4 Sheets—Sheet 2.
A. R. ROE.
RECIPROCATING ELECTRIC MOTOR.
No. 510,367. Patented Dec. 5, 1893.
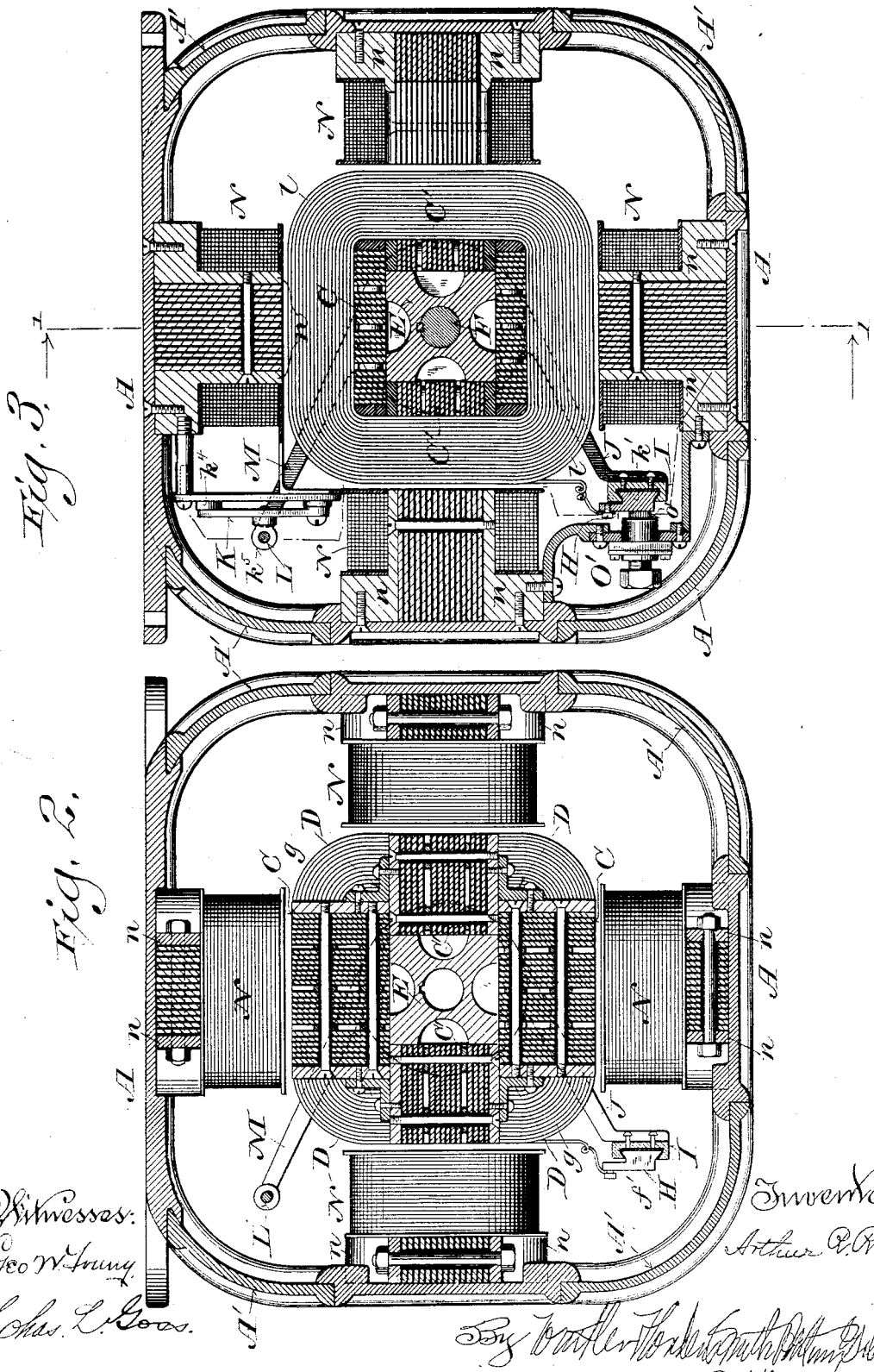
Witnesses:
Geo. W. Truny
Chas. L. Goos.
Inventor:
Arthur R. Roe,
By Butler, Hodden, Smith, Patton & Day
Attorneys.
THE NATIONAL LITHOGRAPHING COMPANY,
WASHINGTON, D. C.

(No Model.) 4 Sheets—Sheet 3.

A. R. ROE.
RECIPROCATING ELECTRIC MOTOR.

No. 510,367. Patented Dec. 5, 1893.

Witnesses:
Geo. W. Young
Chas. L. Goss

Inventor:
Arthur R. Roe (No Model.) 4 Sheets—Sheet 4.
A. R. ROE.
RECIPROCATING ELECTRIC MOTOR.
No. 510,367. Patented Dec. 5, 1893.
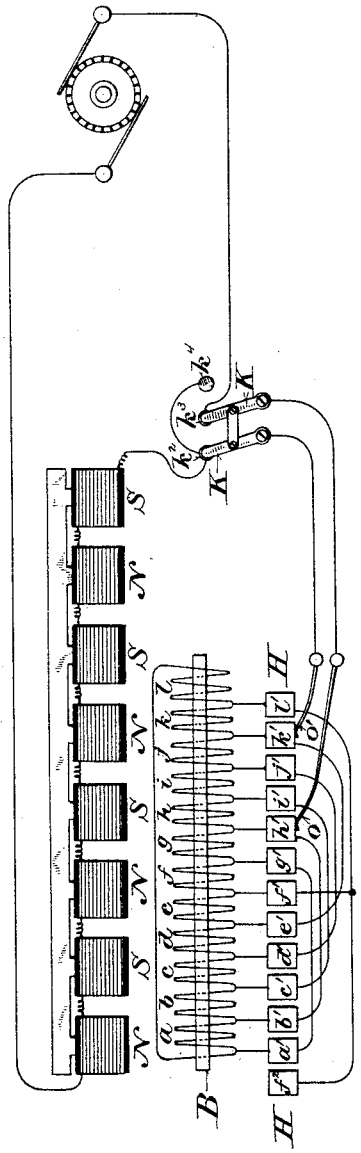
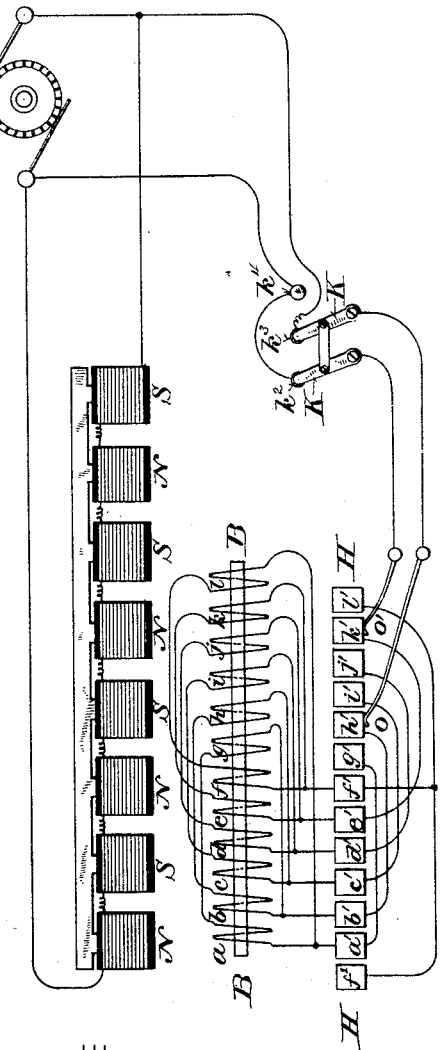
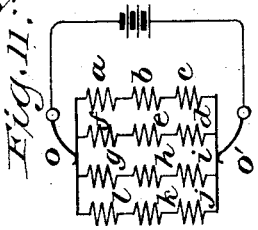
Witnesses:
Geo. W. Young,
Chas. L. Goss.
Inventor:
Arthur R. Roe

UNITED STATES PATENT OFFICE.

ARTHUR R. ROE, OF DULUTH, MINNESOTA, ASSIGNOR TO THE ELECTRIC MOTOR COMPANY, OF SAME PLACE.

RECIPROCATING ELECTRIC MOTOR.

SPECIFICATION forming part of Letters Patent No. 510,367, dated December 5, 1893.

Application filed November 21, 1892. Serial No. 452,626. (No model.)

*To all whom it may concern:*

Be it known that I, ARTHUR R. ROE, of Duluth, in the county of St. Louis and State of Minnesota, have invented certain new and useful Improvements in Reciprocating Electric Motors; and I do hereby declare that the following is a full, clear, and exact description of the invention, which will enable others skilled in the art to which it pertains to make and use the same, reference being had to the accompanying drawings, and to the letters of reference marked thereon, which form a part of this specification.

The main object of my invention is to produce a reciprocating electro magnetic motor, capable of a strong steady stroke of sufficient length for pumping, drilling and other similar operations.

It consists essentially of certain peculiarities in the construction and arrangement of the component parts of the motor, particularly of the armature and commutator, and the mode of connecting the armature coils and commutator segments.

In the accompanying drawings like letters designate the same parts in the several figures.

Figure 4:
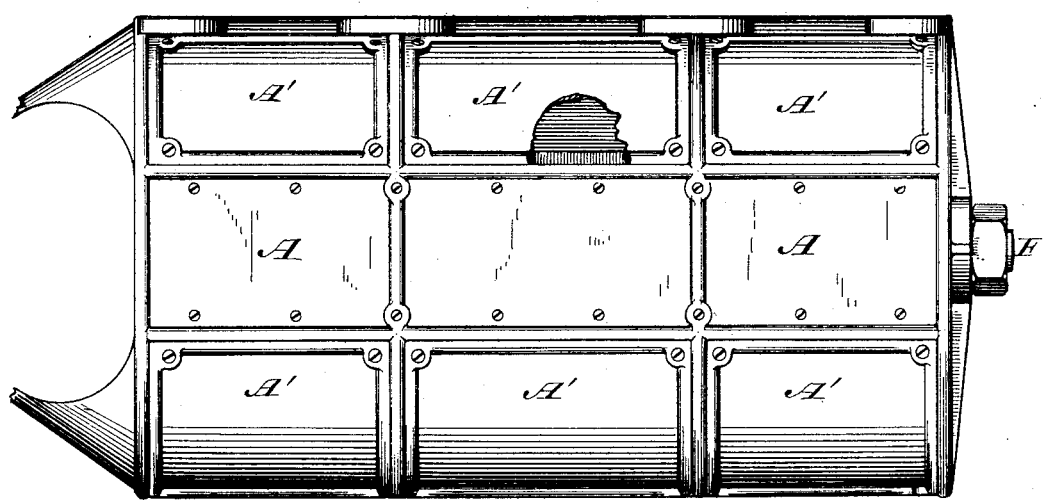
Figure 7:
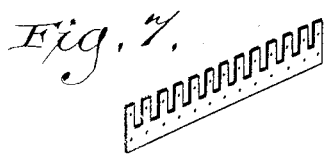
Figure 8:
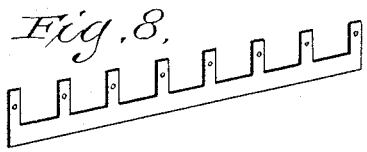
Figure 5:
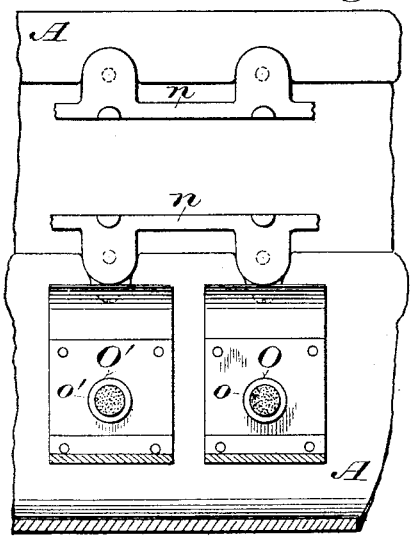
Figure 6:
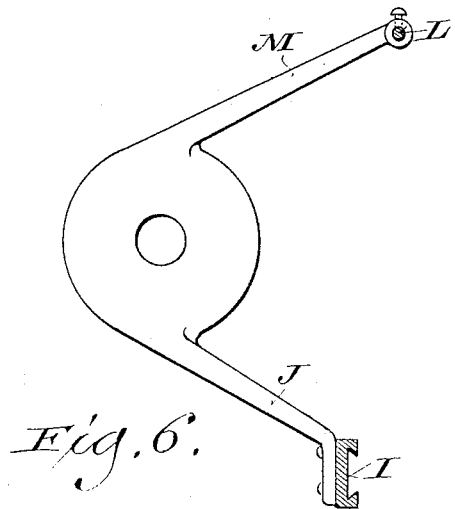

Figure 1 is a vertical longitudinal section of the motor on the line 1, 1, Fig. 3. Fig. 2 is a cross section on the line 2, 2, Fig. 1; Fig. 3, a like section on the line 3, 3, Fig. 1; Fig. 4, a side elevation on a reduced scale of the motor frame or case; Fig. 5, an inside elevation of the brush holders and their connections; Fig. 6, a detail view of one pair of tappet rod and commutator supporting arms; Fig. 7, a perspective view of one of the sheet iron layers of the armature core; Fig. 8, a similar view of one of the layers of the field magnet cores; and Figs. 9, 10, 11 and 12, diagrams illustrating different methods of grouping and connecting the armature coils and commutator plates or sections, and of making the circuit connections with the armature and field coils.

Referring to Figs. 1, 2 and 3, A represents a case or frame of cast iron or other suitable material, to the inside of which are secured the field magnets N S, with their poles projecting inwardly. In the machine herein shown and described there are four parallel rows of field magnets on opposite sides of the case, and the cores are built up of thin layers of sheet metal cut to the shape shown in Fig. 8, and clamped by bolts between wrought iron plates $n$, $n$, which are in turn screwed to the case or frame A, as shown in Fig. 3. The frame or case A, shown in side elevation in Fig. 4, is provided with doors or removable sections A', through which access may be had to the inclosed mechanism and by which a dust tight inclosure for the motor is formed. The field coils are connected so as to produce poles of alternately opposite polarity lengthwise of the motor and of like polarity in the magnets which are directly opposite each other, the reference letters N, S, indicating the polarity of the several field magnets.

B B represent the armature, comprising a core laminated in the direction of its length, and coils, $a$, $b$, $c$, $d$, $e$, $f$, $g$, $h$, $i$, $j$, $k$, $l$, which are let into recesses formed in the core at regular intervals, there being in the motor herein shown and described, three coils to each space corresponding with the distance between adjacent field magnet cores.

The armature core is built up of blocks or sections C, C, C', C', as shown in Fig. 2, each composed of a number of layers of sheet iron, to one side of which a thin coating of insulating material is applied, securely bound together face to face between soft wrought iron plates by bolts or screws passing transversely through and insulated from the core sections. One of these sheet iron layers is shown in detail in Fig. 7. These sections or blocks are assembled so as to form a core cruciform in cross section with a square opening extending lengthwise through the center, and they are connected with each other and held in place by brackets D D, screwed thereto. A spider E, of brass or other suitable material fitted to the central opening in the armature is secured therein by nuts at the ends. It is formed with a central longitudinal bore to receive the guide rod F, which is secured at one end in one end of the frame or case A and is provided with a spline or feather to prevent the armature from turning thereon. It is also formed in the sides next to the inner edges of the laminated core sections with recesses which afford air spaces for the purpose of ventilation as well as of avoiding unnecessary weight. Washers are interposed at suitable intervals between the sheet metal laminæ or leaves, thereby affording longitudinal air passages, which in connection with the recesses in spider E, thoroughly ventilate the armature and prevent its becoming overheated.

By the foregoing construction of the armature core the coils may be wound, made thoroughly waterproof and perfectly insulated before they are applied to the core.

In assembling the component parts of the armature, the coils are stood upon their sides at intervals corresponding with the recesses formed for their reception in the core sections. The blocks or sections C C are inserted longitudinally in the coils and then moved outwardly, the coils being guided into the recesses in their outer sides. The sections C' C' are then separately inserted and moved outwardly into place between the sections C C, to which they are secured, as shown in Fig. 2, by the angle pieces or brackets D D, and the spider E is finally inserted and secured as hereinbefore explained, in the central square opening left between the sections which are thus firmly supported and reinforced.

To the end of the armature opposite the guide rod F is centrally attached the connecting rod G, which has a bearing in the frame or case A, in line with said guide rod, and together with said guide rod supports the armature in its working position.

H represents the commutator, comprising a number of insulated plates, $a'$, $b'$, $c'$, $d'$, $e'$, $f'$, $g'$, $h'$, $i'$, $j'$, $k'$, $l'$ and $f^2$, which are arranged parallel with the armature at intervals corresponding with the distances between the armature coils in an undercut grooved plate or bar I carried by arms J J from the armature core or spider E.

K K is a current reversing switch, the arms of which are pivoted at one end to a suitable support and are arranged to engage at the other alternately with contact pieces $k^2$ $k^3$ and $k^4$, when turned in opposite directions.

L is a tappet rod carried by the armature parallel therewith and supported by arms M M. It passes loosely through a bridge piece $k^5$ pivotally connected with the switch arms, and is provided with tappets $l^2$ and $l^3$ adjustably secured thereon so as to shift the switch at each end of the stroke of the armature and thereby reverse the movement of the armature at the proper points by changing the direction of the current either in the field or in the armature coils according to the arrangement of the electrical connections of the motor.

O O' are the brush holders in which the usual or any suitable form and kind of brushes $o$ $o'$ may be used to conduct the current to and from the commutator plates and armature coils connected therewith. The brush holders are set at a distance from each other corresponding exactly or approximately with the distance between adjacent poles of the field magnets.

Referring to Figs. 9 and 11, illustrating one method of grouping and connecting the armature coils and commutator sections and of making the circuit connections with the field and armature coils, the inside end of armature coil $a$ is connected with commutator plate $a'$; the outside end of $a$ and the inside end of $b$ with $b'$; the outside end of $b$ and the inside end of $c$ with $c'$, &c.; the outside end of the last coil $l$ being connected with the inside end of the first coil $a$ or with either or both of the commutator plates $a'$ or $g'$. The armature windings are thus connected in four groups of three coils each in series. The field coils are in this case shown in series with the armature coils.

Referring to Figs. 10 and 12, illustrating another way of grouping and connecting the armature coils and commutator plates and of making the circuit connections with the field and armature coils, the outside end of coil $a$ is connected with the inside end of $g$, the outside of $g$ with the inside of $b$, the outside of $b$ with the inside of $h$, the outside of $h$ with the inside of $c$, the outside of $c$ with the inside of $i$, the outside of $i$ with the inside of $d$, the outside of $d$ with the inside of $j$, the outside of $j$ with the inside of $e$, the outside of $e$ with the inside of $k$, the outside of $k$ with the inside of $f$, the outside of $f$ with the inside of $l$, and the outside of $l$ as in the other case with the inside of $a$, the inside ends of coils $a$, $b$, $c$, $d$, $e$ and $f$ being connected respectively with the commutator plates $a'$, $b'$, $c'$, $d'$, $e'$ and $f'$. The armature windings are thus connected in two groups of six coils each in series. The field coils in this case are shown in shunt with the armature coils. The windings of the four groups or rows of field magnets may be connected in either case in series or multiple arc, according to the conditions under which the motor is to be operated.

By either of the foregoing methods of arranging the windings of the armature, a "closed-coil multipolar armature" is produced, similar to those employed in rotary motors.

In Figs. 11 and 12 the brushes are assumed to be in contact with the commutator plates or sections $a'$ and $d'$.

In Figs. 9 and 10 the switch K K is shown as arranged to reverse the current in the armature, but reversing the current in the fields would obviously produce the same result.

In whatever way the armature coils are grouped and connected the connection between the terminal coils is of prime importance, for by means of this connection the consequent poles induced in the armature core will follow the brushes, whatever the position of the armature may be with reference to the brushes, but without such connection some of the armature coils would be cut out of circuit in certain positions, as when the brushes are in contact with intermediate plates or sections of the commutator, or the ends of the armature are not equidistant from adjacent poles of the field magnets, and consequently the resistance of the armature coils would be variable and the relative positions and number of the poles induced in its core would be unstable and variable, thus detrimentally affecting the operation of the motor. For illustration, assuming brush $o$ to be positive and to be in contact with commutator plate $c'$, brush $o'$ to be negative and to be in contact with commutator plate $f'$, and the induced poles in the armature to correspond in position with and to follow the polarity of the brushes, with the connections between the armature coils and commutator plates as shown in Fig. 9, the armature coils being wound from front to back and from left to right, the current will flow from plate $c'$ through the coils $c$, $d$ and $e$ to the plate $f'$; from the plate $i'$ connected with plate $c'$, through the coils $h$, $g$ and $f$ to the plate $f'$; from the plate $i'$ through the coils $i$, $j$ and $k$ to the plate $l'$ connected with the plate $f'$; from the plate $c'$ through the coils $b$, $a$ and $l$ to the plate $l'$, thereby inducing positive poles in the armature core between the coils $b$ and $c$ and between the coils $h$ and $i$, and negative poles between the coils $e$ and $f$ and the coils $k$ and $l$, the current passing through coils $b$ and $a$, co-operating with the coils $c$, $d$ and $e$ to produce and hold a positive pole between the coils $b$ and $c$, and the current passing through the coil $l$ co-operating with the coils $i$, $j$ and $k$ to produce and hold a negative pole in the armature core between the coils $k$ and $l$.

With the armature and commutator connections made as last above specified, the current passes through the armature coils in four separate paths of the same or approximately the same resistance, whatever the position of the armature may be with reference to the brushes; consequently the resistance of the armature and the current strength will be invariable. A negative pole will be induced at the extreme left end of the armature core, and a positive pole at the extreme right end, but in practice the effect of this is not detrimental to the operation of the motor.

With the same connections and under the same conditions except with the omission of the connection between opposite ends of the first and last coils of the armature, current will flow from the plate $c'$ through coils $c$, $d$ and $e$ to plate $f'$, from plate $i'$ through coils $i$, $j$ and $k$ to plate $l'$, and from plate $i'$ through coils $h$, $g$ and $f$ to plate $f'$, as hereinbefore explained, but no current will flow through coil $l$; and current will pass from plate $c'$ through coils $b$ and $a$ to plate $a'$, thence by its connection with plate $g'$ through coil $f$ to plate $f'$. The coil $f$ will thus be in series with coils $b$ and $a$, and also with the coils $h$ and $g$, and consequently the resistance of each of these groups will be increased, the current through them reduced, and the induced poles in the armature shifted or displaced to the left. It will thus be seen that the omission of the connection between the first and last coils will render the resistance and current strength, as well as the induced poles of the armature, unstable, thereby detrimentally affecting the operation of the motor. Again, assuming the connection between the first and last coils of the armature and the connections between the commutator plates to be omitted, and two pairs of brushes to be employed, two positive, one in contact with plate $c'$ and the other in contact with plate $i'$, and two negative, one in contact with plate $f'$ and the other in contact with plate $l'$, the connections between the armature coils and the commutator plates being otherwise as they are shown in Fig. 9, the current will flow from plate $c'$ through coils $c$, $d$ and $e$ to plate $f'$, and through coils $h$, $g$ and $f$ to plate $f'$, and from plate $i'$ through coils $i$, $j$ and $k$ to plate $l'$ as before, inducing positive poles between coils $h$ and $i$ and to the left of the coil $c$, and negative poles between coils $e$ and $f$ and to the right of coil $k$. The coils $a$ and $b$ on the left and the coil $l$ on the right will be cut out of circuit, and no current passing through them, the positive pole induced by the coils $c$, $d$ and $e$ will be at the extreme left end of the armature core, and for the same reason the negative pole induced by the coils $i$, $j$ and $k$ will be at the extreme right end of the armature core. In this case there will be but three instead of four paths for the current through the windings of the armature; the resistance of the armature will be consequently increased, the current strength reduced, and the operation of the motor detrimentally affected.

To avoid the necessity of using a number of brushes corresponding with the number of poles induced in the armature, the plates or sections of the commutator connected with the coils which are to be of the same polarity are connected with each other, viz: plate $a'$ with $g'$; $b'$ with $h'$; $c'$ with $i'$; $d'$ with $j'$; $e'$ with $k'$; $f'$ with $l'$ and $f^2$.

The commutator sections and brushes are shown in Fig. 1 displaced to the right from the armature coils with which they are connected. This is simply a matter of convenience in construction in order to bring the brushes opposite one of the doors A' in the frame or case where they will be easily accessible. For the length of stroke for which the motor herein shown and described is designed, a commutator plate for connection with the outer end of armature coil $l$ would be useless, and therefore for this reason as well as for the purpose hereinbefore explained, the outer end of said coil is directly connected with the inner end of coil $a$, or with either of the commutator plates $a'$ and $g'$. When the armature is at the end of its stroke opposite that in which it is shown in Fig. 1, the commutator plate $a'$ would be beyond brush $o$ to the right, and since in this position of the armature the coils connected with the commutator plates $f'$ and $l'$ should be in circuit with the brush $o$, an extra commutator plate or section $f^2$ with which the plates $f'$ and $l'$ are connected, is provided at the left hand end of the commutator.

Various changes in the details of construction and arrangement of parts and in the method of making the electrical connections of the motor may be made within the intended scope and spirit of my invention.

Obviously in place of a switch for reversing the current through the armature or field coils, the brushes might be shifted alternately in opposite directions at the end of each stroke of the armature a distance approximately equal to the distance between field magnet cores.

I claim—

1. In a reciprocating electric motor, the combination of a series of field magnets arranged in the direction of the movement of the armature of alternately oppositely polarity and a reciprocating armature provided with a series of coils arranged at intervals of its length shorter than the intervals between the field magnets, substantially as and for the purposes set forth.

2. In a reciprocating electric motor, the combination of a series of field magnets of alternately opposite polarity in the direction of the movement of the armature, and a reciprocating armature provided with a series of coils arranged at intervals of its length, one end of the last coil being connected with the opposite terminal of the first coil, substantially as and for the purposes set forth.

3. In a reciprocating electric motor, the combination of a series of field magnets of alternately opposite polarity in the direction of the movement of the armature, a reciprocating armature provided with a series of coils arranged at intervals of its length, a commutator connected and movable with said armature and comprising a series of insulated plates or sections arranged parallel with the axis of the armature at intervals corresponding with its coils with which they are connected, and brushes arranged to make contact with the commutator plates at intervals corresponding approximately with the intervals between field magnets, substantially as and for the purposes set forth.

4. In a reciprocating electric motor, the combination of a series of field magnets of alternately opposite polarity in the direction of movement of the armature, a reciprocating armature provided with a series of coils arranged at intervals of its length, a commutator connected and movable with said armature and comprising a series of insulated plates or sections arranged parallel with the axis of the armature at intervals corresponding with its coils with which they are connected, said commutator plates or sections being connected with each other at intervals corresponding approximately with the distance between field magnets of like polarity, and two brushes arranged to make contact with said commutator plates or sections at intervals corresponding approximately with the distance between adjacent field magnets of unlike polarity, substantially as and for the purposes set forth.

5. In a reciprocating electric motor, the combination of a series of field magnets of alternately opposite polarity in the direction of movement of the armature, a reciprocating armature comprising a series of coils arranged at intervals of its length, and a commutator connected and movable with said armature comprising a series of plates or sections arranged at intervals corresponding with those of the armature coils and shifted in the direction of the movement of the armature out of positions opposite the coils with which they are respectively connected, substantially as and for the purposes set forth.

6. In a reciprocating electric motor, the combination of a series of field magnets of alternately opposite polarity in the direction of movement of the armature, a reciprocating armature comprising a series of coils arranged at intervals of its length, and a commutator connected and movable with said armature and having a series of plates or sections corresponding in number and arrangement with the armature coils with which they are severally connected and shifted in the direction of movement of the armature out of position opposite the coils with which they are respectively connected, and an extra plate or segment at the end of the commutator from which said plates are shifted, substantially as and for the purposes set forth.

7. In a reciprocating electric motor, the combination of a series of field magnets of alternately opposite polarity in the direction of movement of the armature, a reciprocating armature comprising a series of coils arranged at intervals of its length, a commutator connected and movable with said armature and comprising a series of insulated plates or sections corresponding in number and arrangement with the armature coils with which they are severally connected, but shifted in the direction of movement from a position opposite the coils with which they are connected, and an extra plate at the end of the commutator from which said plates are shifted, said plates or sections being connected with each other at intervals corresponding approximately with the intervals between field magnets of like polarity, and two brushes arranged to make contact with said plates or sections at intervals corresponding with the distance between adjacent field magnets of unlike polarity, substantially as and for the purposes set forth.

8. In a reciprocating electric motor, the combination with a suitable frame or case of a series of field magnets of alternately opposite polarity arranged lengthwise of said case with their poles projecting inwardly, a reciprocating armature having a series of coils arranged at intervals of its length, and a connecting rod which has a bearing in one end of said frame or case, and a guide rod secured in the other end of said frame or case and projecting loosely into a longitudinal opening in said armature, substantially as and for the purposes set forth.

9. In a reciprocating electric motor, the combination of a suitable frame or case, field magnets secured to the inside of said case with their poles projecting inwardly and arranged in one or more parallel rows lengthwise of said frame or case, the magnets of each row being of alternately opposite polarity, and opposite magnets of different rows being of the same polarity, and a reciprocating armature supported axially between said magnets by a connecting rod secured to one end of the armature and having a bearing in the adjacent end of said case, and by a guide rod loosely inserted in the other end of said armature and secured in the opposite end of said case, said armature having a series of coils arranged at intervals of its length, substantially as and for the purposes set forth.

10. In a reciprocating electric motor, a straight or bar armature comprising a series of coils, and a core composed of externally and transversely grooved sections capable of insertion inside of the coils after they are wound, substantially as and for the purposes set forth.

11. In a reciprocating electric motor, a straight or bar armature comprising a series of coils, and a core composed of laminated sections externally and transversely grooved to receive said coils, each capable of insertion within the coils after they are wound, substantially as and for the purposes set forth.

12. In a reciprocating electric motor, a straight or bar armature comprising a series of coils, and a core composed of laminated sections between which air spaces are left at intervals, said sections being externally and transversely grooved to receive said coils, substantially as and for the purposes set forth.

13. In a reciprocating electric motor, a straight or bar armature comprising a series of coils, and a core composed of laminated sections each consisting of thin plates of metal clamped between thicker outside plates by bolts passing transversely through them, said sections being externally and transversely grooved at intervals to receive said coils and secured to each other when assembled within the coils by angle plates or brackets, substantially as and for the purposes set forth.

14. In a reciprocating electric motor, a straight or bar armature, comprising a series of coils, and a core composed of longitudinally laminated sections externally and transversely grooved at intervals to receive said coils, and a spider inserted in the opening left between said sections when they are assembled within the coils, substantially as and for the purposes set forth.

15. In a reciprocating electric motor, a straight or bar armature, comprising a series of coils and a core composed of longitudinally laminated sections between which air spaces are left at intervals, externally and transversely grooved at intervals to receive said coils, and a longitudinally bored and externally recessed spider inserted in the opening between said sections when they are assembled within the coils, substantially as and for the purposes set forth.

16. In a reciprocating electric motor, the combination of a suitable frame or case, a series of field magnets attached to the inside of said case with their poles projecting inwardly and arranged in one or more rows lengthwise of the case, said magnets being of longitudinally opposite polarity lengthwise of the motor and composed of coils wound upon projections of a longitudinally laminated core, and a reciprocating armature composed of a series of coils and a longitudinally laminated core externally and transversely grooved at intervals to receive said coils, substantially as and for the purposes set forth.

17. In a reciprocating electric motor, the combination of a series of field magnets of alternately opposite polarity lengthwise of the motor, a reciprocating armature comprising a series of coils arranged at intervals of its length, a commutator connected and movable with said armature and comprising a series of insulated plates or sections corresponding in number and arrangement with said coils which are severally connected therewith, and a device for reversing the current through the field or armature coils at the end of each stroke of the armature, substantially as and for the purposes set forth.

18. In a reciprocating electric motor, the combination of a case or frame provided with doors or removable sections, field magnets arranged in a number of rows inside and lengthwise of said case, with their poles, which are of alternately opposite polarity lengthwise of the motor, projecting inwardly, said field magnets being composed of cores laminated lengthwise of the motor and formed at intervals with projections, and of coils wound upon said projections, a reciprocating armature supported axially between the field magnets upon a connecting rod at one end and a guide rod at the other, and composed of a sectional longitudinally laminated core and of coils let into external transverse grooves at intervals in said core, a commutator connected and movable with said armature and provided with a series of insulated plates corresponding in number and arrangement with the armature coils with which they are severally connected, brushes arranged to make contact with said commutator plates at intervals corresponding approximately with the distance between adjacent field magnets, and a current reversing switch in the circuit connections arranged to be moved in opposite directions by the movement of the armature at or near the limits of its stroke, substantially as and for the purposes set forth.

In testimony that I claim the foregoing as my own I affix my signature in presence of two witnesses.

ARTHUR R. ROE.

Witnesses:
F. W. MERRITT,
S. H. MOER.